March 6, 1951  F. A. SCHNEIDER  2,544,112
SINTERED BATTERY PLATE AND PROCESS OF MAKING
Filed Jan. 5, 1949

Inventor:
Friedrich A. Schneider,
By Pierce, Scheffler & Parker,
Attorneys.

Patented Mar. 6, 1951

2,544,112

UNITED STATES PATENT OFFICE 2,544,112

SINTERED BATTERY PLATE AND PROCESS OF MAKING

Friedrich August Schneider, Venlo, Netherlands, assignor to Accumulatoren Fabriek Varta N. V., Amsterdam, Netherlands, a company of the Netherlands Application January 5, 1949, Serial No. 69,399
In the Netherlands May 17, 1947

8 Claims. (Cl. 136—29)

This invention relates to improvements in the manufacture of accumulator plates sintered from powdered metal, and to the resulting improved products.

The novel process of the present invention is based on the observation that when a metal powder is sintered on metal and the porous material is subsequently pressed onto the metal under high pressure and then heated once more, the connection between the metal and the material sintered on it is so firm that the combination can be worked in a punching machine without being damaged.

According to the invention a process for the manufacture of plates sintered from metal powder, particularly for alkaline accumulators, consisting in applying on a metal grid a piece of metal gauze and then a layer of metal powder and sintering this powder, is carried out in such a manner that the size of the grid is chosen larger than that of the finished plate and the piece of gauze larger, at least, than the body of the plate, while after a light sintering of the powder the porous material obtained is subjected to a pressing operation in which the porous material along the edge of the grid is highly compressed and the porous material in the remaining area of the grid is subjected only to such pressure that the desired thickness of the porous material is attained, upon which the sintering is renewed, followed, if necessary, by impregnation, and the plate is punched to the desired shape.

A grid here implies a frame as well as a lattice, i. e., a frame with cross-connections. The grid may, for example, consist of tin-plate in a manner known per se; however, other metals may also be used instead.

The invention will now be explained in greater particularity and with reference to the appended drawing, illustrating a few embodiments, in which.

Figure 1:
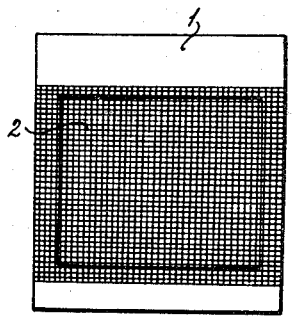
Fig. 1 is a plan view of an initial assemblage of grid and gauze adapted for use in carrying out the invention.

Fig. 1 shows a grid 1 with a piece of metal gauze 2 welded onto it. The grid, which has the shape of a frame, is larger than the finished plate including the lug. The piece of gauze is at least larger than the body of the plate.

Figure 1A:
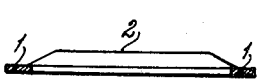
Fig. 1a is a cross-sectional view of the assemblage shown in Fig. 1.

Fig. 1a is a cross-section of Figure 1. The gauze 2 is seen to be slightly arched.

Figure 2:
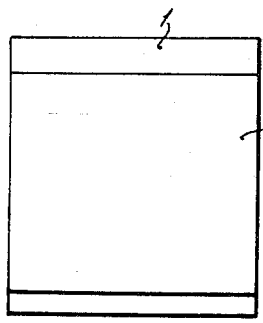
Fig. 2 is a plan view of the assemblage of Fig. 1 at a subsequent stage of the process.

Figure 2 illustrates the plate of Figure 1 after a certain quantity of metal powder 3 has been applied on it and lightly sintered.

Figure 2A:
Fig. 2a is a cross sectional view of the assemblage shown in Fig. 2.

Figure 2a is a cross-section of Figure 2. The gauze is about half-way up the sintered material 3.

Figure 3:
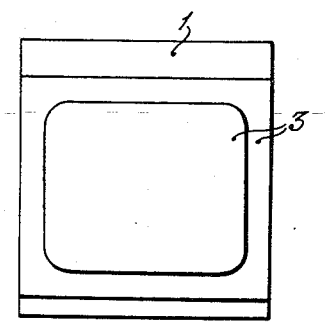
Fig. 3 is a plan view of the assemblage of Fig. 2 after the same has been subjected to heavy pressure about its periphery but less heavy pressure over the remaining area of the assemblage.
Figure 3A:
Fig. 3a is a cross-sectional view of the assemblage of Fig. 3.

Figure 3 illustrates the plate of Figure 2 after its edge has been pressed under high pressure and the middle less highly compressed. The cross-section is illustrated in Figure 3a. The pressing of the edge and middle of the plate may be effected in a single operation by applying a pressing die with a suitable profile, which acts on the upper side of the sintered material (Fig. 2a).

Figure 4:
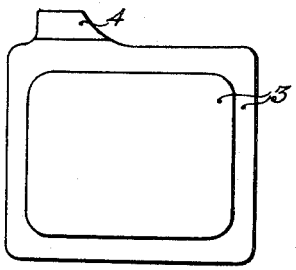
Fig. 4 is a plan view of a finished accumulator plate.

Figure 4 illustrates the finished plate, which has been produced by sintering the body of Figures 3 and 3a once more than then punching it to the desired shape. The lug is indicated by 4.

In the process carried out according to the invention, after the first sintering (Fig. 2) the plate is pressed into a die in such a manner that the porous mass is pressed onto the grid 1 under extreme pressure across a breadth of a few millimeters, while the surface proper of the plate is pressed only to the thickness required for the plate itself (Figs. 3 and 3a). Thereupon, the plate is heated once more; impregnated, if necessary; and then punched to its final shape (Fig. 4).

The temperature for the second sintering may vary according to the circumstances. Thus, for a plate of copper powder with a grid of nickel-plated iron, such as may be used for negative plates, the temperature of the second sintering should preferably be lower than that of the first, because thus the surface of the porous copper body of the plate remains as large as possible, while at the same time a sufficiently firm connection between the body of the plate and the grid is brought about. On the other hand, with plates of nickel powder, such as are used for positive plates, the temperature of the second sintering should preferably be higher in order to obtain the best possible connection between the body of the plate and the grid, the size of the surface of the porous body of the plate being in this case of less importance.

It has been found that during the pressing of the porous material onto the grid with gauze difficulties may arise as a result of the fact that during the first sintering the grids may not always lie perfectly flat on the bottom of the mold, or the metal powder may not be distributed quite uniformly and may shrink too much in some places. Owing to this, during the pressing the porous material may shift with respect to the grid, which may cause detrimental cracks in the region between the highly compressed edge and the less highly compressed body.

Careful examination of these phenomena showed that this evil may always be avoided by a suitable combination, according to the metal powder to be used, of the inclination of the region (vide the angle A in Fig. 3a) between the highly compressed edge and the less highly compressed remainder of the plate, and the width of the grid and the width of the highly compressed edge. Thus, a plate of nickel powder, 2 mm. thick, with a grid of nickel-plated iron may be manufactured so as to be completely reliable, if the grid bars of the finished plate are taken 5 to 6 mm. wide and the highly compressed edges 2 to 2½ mm. wide, while the inclination of the separating region forms an angle not exceeding 30° with the bottom of the plate. On the other hand, a plate of the same size, but made of copper powder, on the same grid, may be manufactured with an inclination of more than 60° without causing any difficulties.

When plates of other thicknesses, other metal powders and other grids are made, it is always possible to find a suitable combination.

A plate manufactured in accordance with the invention presents the following advantages:

1. Plate and lugs are connected in an absolutely stable fashion. The lugs may be welded.
2. The edges of the plates can not cause short-circuits and need not be trimmed, so that the production becomes much simpler and cheaper.
3. The thickness of the plates may be adjusted very accurately, so that uniform capacity and easy assembly are guaranteed.
4. The filling of the molds need not meet exceptional demands, since the uniform thickness of the plates is attained by pressing, which also involves a reduction of the cost of production.

In amplification of the above-stated advantages the following is noted: Omission of the trimming of the plate edges obviates the inherently attending breaking off of fragments of the porous part of the plate during such trimming, and the inadvertent protruding of gauze beyond the edges of the plate, with consequent causation of short-circuits in use. The present process also makes it possible to fabricate a plurality of plates on a multiple grid and thereafter punch the same into individual plates without danger of cracking the multiplate plates or damaging the individual plates.

When manufacturing small plates, it is advantageous to use a common multiple grid for a number of plates, the edges of the porous material of the various plates being pressed onto the multiple grid simultaneously. Thus a further reduction of the cost of production is attained, while no breakage of the multiple plate during impregnation is possible, owing to the common grid.

Figure 5:
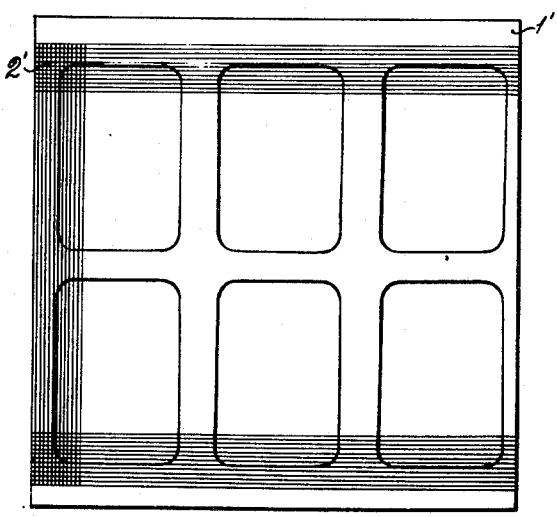
Fig. 5 illustrates a modification of the construction shown in Fig. 1.

Figure 5 illustrates a multiple grid I' with gauze 2' which may be used in carrying out the present process. The grid is intended for the manufacture of six plates, three of the portions from which the lugs are to be provided lying along the upper and three along the lower edge of the composite. The punching of the various plates may be effected separately or simultaneously. The latter method will, of course, again reduce the cost of production.

I claim:

1. The process for the manufacture of accumulator plates, carrying conducting lugs, sintered from metal powder, in particular for alkaline accumulators, in which a piece of metal gauze and then a layer of metal powder are applied on top of a metal grid and said powder is sintered, characterized in that the grid is chosen larger than the finished plate including its conducting lug and the piece of gauze larger at least than the finished plate without its conducting lug, and that after a light sintering of the powder the porous material thereby obtained is subjected to a pressing operation in which the porous material along the edge of the grid is highly compressed and the porous material in the remaining area of the grid is subjected only to such lesser pressure that the desired thickness of the porous material is attained, whereupon the sintering is repeated, and the plate is punched to the desired shape.

2. Process for the manufacture of accumulator plates sintered from powdered metal, which comprises deforming a sheet of metal gauze in such manner that the center portion is slightly arched, welding the arched sheet of metal gauze onto an apertured metal grid so that the arched portion of the gauze is disposed above and covering the aperture of the latter, applying to the gauze and to a substantial portion of the grid a layer of substantial thickness of powdered metal, an end portion of the grid being substantially uncovered, subjecting the resulting assemblage to incipient sintering to produce a porous tablet in which the grid is adjacent one face of the tablet and the arched portion of the gauze is intermediate the opposed faces thereof, compressing the tablet in a die in such manner that the marginal portions of the former coextensive with the grid are compressed under extreme pressure while the center portion of the tablet is pressed at a lesser pressure to a desired thickness greater than that of said marginal portions, subjecting the resulting compressed tablet to a second sintering operation, and punching out of the tablet an accumulator plate of an over-all size as regards length and breadth smaller than that of the original grid, said plate presenting as a plate-attaching lug an unsevered part of the substantially uncovered end portion of said grid.

3. Process according to claim 2, in which the compressing step is so effected that in the region of the tablet between the most severely compressed marginal portions and the less compressed main central portion the compression is graduated to provide a beveled intermediate portion.

4. Process according to claim 1, characterized in that for the manufacture of a number of plates a multiple grid is used, the edges of the porous material of the various plates being pressed onto the multiple grid simultaneously.

5. Process defined in claim 1, in which the plate is impregnated after the second sintering operation but before the punching operation.

6. Process defined in claim 2, in which the resintered tablet is impregnated before punching.

7. An accumulator plate comprising a generally rectangular metal grid having at one edge thereof an outstanding integral lug, on one side of said metal grid a generally rectangular sheet of metal gauze coextensive and in alignment with said grid minus its outstanding lug the periphery of said metal gauze sheet being contiguous with the adjacent surface of said grid and the central portion of said metal gauze sheet being dished concavely with respect to the plane of the adjacent surface of said grid, and a coherent body of metal powder sinter in contact with one side of and coextensive with said grid minus its outstanding lug and enveloping said metal gauze sheet, the peripheral portion of said body being substantially denser and of less thickness than the middle portion thereof.

8. An accumulator plate comprising a generally rectangular metal grid having at one edge thereof an outstanding integral lug, on one side of said metal grid a generally rectangular sheet of metal gauze coextensive and in alignment with said grid minus its outstanding lug the periphery of said metal gauze sheet being contiguous with the adjacent surface of said grid and the central portion of said metal gauze sheet being dished concavely with respect to the plane of the adjacent surface of said grid, and a coherent body of metal powder sinter in contact with one side of and coextensive with said grid minus its outstanding lug and enveloping said metal gauze sheet, the peripheral portion of said body being substantially denser and of less thickness than the middle portion thereof, the peripheral portion merging into the middle portion through a generally rectangular intermediate zone of progressively reduced density inwardly from said periphery the outer surface of said intermediate zone having an inclination of from about 30° to about 60° to the plane of the grid.

FRIEDRICH AUGUST SCHNEIDER.

REFERENCES CITED

The following references are of record in the file of this patent:

UNITED STATES PATENTS

| Number | Name | Date |
| --- | --- | --- |
| 555,304 | Crowdus | Feb. 25, 1896 |
| 623,195 | Werner | Apr. 18, 1899 |
| 882,144 | Edison | Mar. 17, 1908 |
| 897,833 | Hubbell | Sept. 1, 1908 |
| 1,479,859 | Koehler | Jan. 8, 1924 |
| 1,940,385 | Ackerman | Dec. 19, 1933 |
| 2,198,042 | Schlecht | Apr. 23, 1940 |
| 2,251,913 | Brennan | Aug. 12, 1941 |

FOREIGN PATENTS

| Number | Country | Date |
| --- | --- | --- |
| 311,141 | Great Britain | May 9, 1929 |
| 650,621 | Germany | Sept. 27, 1937 |